Dec. 19, 1933.        J. C. McCUNE        1,939,911
ANGLE COCK DEVICE
Filed July 6, 1932
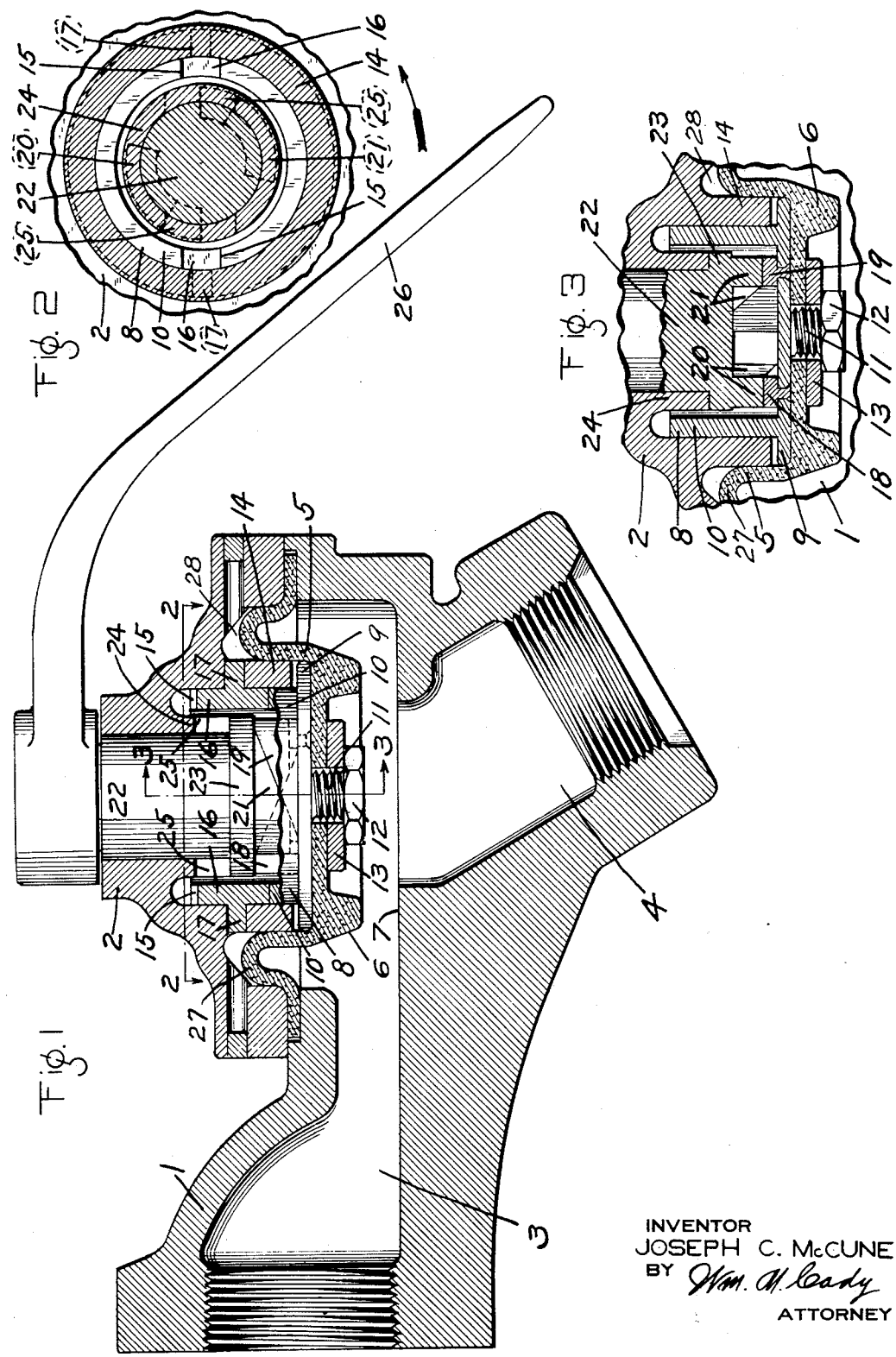
INVENTOR
JOSEPH C. McCUNE
BY *Wm. M. Cady*
ATTORNEY Patented Dec. 19, 1933

1,939,911

UNITED STATES PATENT OFFICE 1,939,911

ANGLE COCK DEVICE

Joseph C. McCune, Edgewood, Pa., assignor to The Westinghouse Air Brake Company, Wilmerding, Pa., a corporation of Pennsylvania Application July 6, 1932. Serial No. 621,030

7 Claims. (Cl. 251—24)

This invention relates to hand operated cock devices and more particularly to angle cock devices such as are employed to control communication through a brake pipe of a fluid pressure brake system.

The principal object of my invention is to provide a novel angle cock device which is of simple construction, cheap to manufacture, efficient in operation, and easy to assemble and disassemble and in which the possibility of leakage is reduced to a minimum.

Another object of my invention is to provide an angle cock device having a flexible diaphragm valve for opening and closing communication through the device.

A further object of my invention is to provide an angle cock device having a flexible diaphragm valve and a novel compact mechanism for controlling the operation of the valve to open and close communication through the device.

Other objects and advantages will appear in the following more detailed description of my invention.

In the accompanying drawing; Fig. 1 is a longitudinal vertical sectional view through an angle cock device embodying my invention; Fig. 2 is a fragmentary horizontal sectional view of the device taken on the line 2—2 of Fig. 1; and Fig. 3 is a fragmentary vertical sectional view taken on the line 3—3 of Fig. 1.

As shown in the drawing, my improved angle cock device may comprise a casing having body and cover sections 1 and 2 respectively which are rigidly secured together by any desired means. The body section 1 has a passageway 3 to which is connected the usual brake pipe (not shown) and also has a passageway 4 to which is connected the usual flexible coupling hose (not shown).

Contained within the casing is a flexible diaphragm 5 which is preferably made from a rubber composition, the outer edge portion of the valve being securely clamped between the casing sections 1 and 2. The under side of this diaphragm is provided with a downwardly depending annular seat rib 6 which is adapted to seat on a seat 7 on the body section 1 and close communication from the passageway 3 to the passageway 4. It will thus be seen that the diaphragm 5 serves as a valve.

Above the diaphragm 5 and contained in the casing is a follower member 8 which comprises a horizontally disposed follower 9 and an annular guide lug 10 which extends upwardly from one side of the follower 9. Depending downwardly from the other side of the follower 9 and extending through a central opening in the diaphragm 5 is a threaded projection 11 which has a nut 12 turned thereon for clamping the diaphragm and follower together, there being a washer 13 interposed between the nut and the under side of the diaphragm for preventing damage of the diaphragm when the nut is turned.

The annular guide lug 10 of the follower member fits within a downwardly depending annular guide lug 14 of the casing cover section 2 and is movable vertically relative thereto. The guide lug 10 has vertical slots 15 formed therein which are open at their upper ends. Each of these slots receive the head 16 of a pin 17 anchored in the guide lug 14 against vertical movement.

The upper side of the follower 9 is provided with wedge-shaped members 18 and 19 which may be secured to the follower 9 as shown in the drawing or may be made integral with the follower. The upper surfaces of these members are friction surfaces and are oppositely inclined and are engaged by corresponding friction surfaces on wedge-shaped members 20 and 21 which may be integral with or secured to the lower end of an operating stem 22 rotatably mounted in the cover section 2.

The operating stem 22 is provided with a collar 23 which engages the lower edge of an annular lug 24 depending downwardly from the cover section 2, thus forming a thrust bearing which prevents outward movement of the stem relative to the casing. The lug 24 has slots 25 formed therein which are open at their lower ends and are for the purpose of permitting the heads 16 of the pins 17 to be passed therethrough in assembling or disassembling the device.

For the purpose of rotating the operating stem 22 there is mounted on the upper end thereof an operating handle 26 of any desired type.

When the angle cock device is open as shown in the drawing, an upwardly extending annular corrugation 27 which is formed in the diaphragm 5 intermediate the seat rib 6 and the clamping flange is received in an annular recess 28 formed in the casing section 2, one wall of the corrugation being supported by the annular lug 14. This corrugation, as will be understood, is for the purpose of permitting sufficient movement to seat the rib 6 without stretching the diaphragm.

When it is desired to close communication through the angle cock device, the handle 26 is moved in the direction indicated by the arrow in Fig. 2, rotating the operating stem 22 and the wedge-shaped members 20 and 21 carried by the stem, in the same direction. As the members 20 and 21 are thus moved, the sloping surfaces thereof will slide over the corresponding sloping surfaces of the members 18 and 19 carried by the follower member 8. It will here be noted that as the members 20 and 21 are moved by the operating stem they will have a tendency to rotate the follower member, but such rotary movement will be prevented by the engagement of the follower guide lug 10 with the heads 16 of the pins 17 anchored to the cover section 2. As the operating stem is thus rotated it will have a tendency to move upwardly, due to the wedging action set up between the follower member and the stem, but such movement is prevented by the collar 23 engaging the annular lug 24 of the cover section 2. Since rotary movement of the follower member and upward movement of the stem 22 is thus prevented, the wedge-shaped members carried by the stem and the corresponding members carried by the follower 9 cooperate in such a manner that the follower will be caused to move downwardly relative to the operating stem, flexing the diaphragm 5 so that the annular seat rib 6 thereof seats on the seat 7, thus closing communication through the cock device. In the present embodiment of the invention, the degree of inclination of the sloping friction surfaces of the members 18, 19, 20 and 21 is such that when the stem 22 is rotated one quarter of a turn from its full open position as shown in the drawing, the seat rib 6 will seat on its seat 7 and close communication through the device, but it will be understood that the degree of inclination may be increased or decreased if it should be desired to rotate the stem more or less than one quarter of a turn.

When the handle 26 is being returned to its open position as shown in Fig. 1, the diaphragm 5, due to its inherent flexibility, may move upwardly toward its open position as the downward pressure of the wedging mechanism is relieved. Fluid under pressure in either or both of the passages 3 and 4 will insure the flexing of the diaphragm to its open position.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A cock device comprising a casing having a valve seat, a flexible diaphragm valve adapted to engage said seat to close communication through the device, a follower member for flexing said diaphragm valve into engagement with said seat, a stem rotatably mounted in said casing, and wedge means carried by the lower end of said stem and cooperating with said follower member for moving said follower member to seat said diaphragm valve.

2. A cock device comprising a casing having a valve seat, a flexible diaphragm valve adapted to engage said seat to close comunication through the device, a follower member for flexing said diaphragm valve into engagement with said seat, a wedge-shaped member carried by said follower member, a stem rotatably mounted in said casing, and means carried by said stem for cooperating with said wedge-shaped means for moving said follower member to seat said diaphragm valve when said stem is rotated in one direction.

3. A cock device comprising a casing having a valve seat, a flexible diaphragm valve adapted to engage said seat to close communication through the device, a follower member for flexing said diaphragm valve into engagement with said seat, a wedge-shaped member carried by said follower member, a stem rotatably mounted in said casing, and wedge-shaped means carried by said stem for cooperating with the wedge-shaped means carried by said follower member for operating said member to seat said valve when the stem is rotated.

4. A cock device comprising a casing having a valve seat, a flexible diaphragm valve adapted to engage said seat to close communication through the device, a follower member for flexing said diaphragm valve into engagement with said seat, a rotatable wedge operative to shift said follower member downwardly to seat said valve, a stem for rotating said wedge, and means for anchoring said follower member against rotation by said wedge as said wedge is being rotated.

5. A cock device comprising a casing having a valve seat, a flexible diaphragm valve adapted to engage said seat to close communication through the device, a follower member for flexing said diaphragm valve into engagement with said seat, a rotatable wedge operative to shift said follower member downwardly to seat said valve, a stem for rotating said wedge, and a pin mounted in said casing and engaged by said follower member for anchoring the member against rotation by said wedge as the wedge is being rotated.

6. A cock device comprising a casing having a valve seat, a flexible diaphragm valve adapted to engage said seat to close communication through the device, a follower member for flexing said diaphragm valve into engagement with said seat, a rotatable wedge operative to shift said follower member downwardly to seat said valve, a stem for rotating said wedge, means on said stem engaging said casing for preventing longitudinal movement of the stem as it is being rotated, and means for anchoring said follower against rotary movement.

7. A cock device comprising a casing having a valve seat, a flexible diaphragm valve adapted to engage said seat to close communication through the device, a follower member operative for flexing said diaphragm valve into engagement with said seat, wedge means for actuating said follower member, a rotatable stem for controlling the operation of said wedge means, and means anchoring said stem against longitudinal movement relative to the casing as it is rotated.

JOSEPH C. McCUNE.